United States Patent [19]
Ponzio

[11] 4,231,014
[45] Oct. 28, 1980

[54] PROCESS AND APPARATUS FOR AUTOMATICALLY IDENTIFYING DISCOUNT COUPONS AND THE LIKE BY MEANS OF ELECTRONIC COMPARISON

[76] Inventor: Vittorio Ponzio, Via Tortora 74, Milan, Italy

[21] Appl. No.: 30,910

[22] Filed: Apr. 17, 1979

Related U.S. Application Data

[63] Continuation-in-part of Ser. No. 780,162, Mar. 22, 1977, abandoned.

[51] Int. Cl.² .............................................. G06K 9/00
[52] U.S. Cl. .......................... 340/146.3 Y; 235/92 SB; 340/146.3 AC; 340/146.3 AG
[58] Field of Search ................. 340/146.3 B, 146.3 R, 340/146.3 Y, 146.3 Q, 146.3 AC, 146.3 AG; 364/515; 235/454, 494, 92 PC, 92 SA, 92 SB, 92 NT; 250/567, 568, 226; 356/379, 380, 408

[56] References Cited
U.S. PATENT DOCUMENTS

| | | | |
|---|---|---|---|
| 3,480,785 | 11/1969 | Aufderheide | 250/567 |
| 3,930,230 | 12/1975 | Stephens | 340/146.3 AG |
| 3,930,231 | 12/1975 | Henrichon, Jr. et al. | 340/146.3 AC |
| 3,932,839 | 1/1976 | Stephens | 340/146.3 R |
| 3,935,562 | 1/1976 | Stephens | 235/921 PC |
| 4,041,456 | 8/1977 | Ott et al. | 340/146.3 Q |
| 4,075,604 | 2/1978 | Degasperi | 340/146.3 B |

OTHER PUBLICATIONS

Stark, "An Optical-Digital Computer For Parallel Processing of Images," *IEEE Trans. on Comp.*, vol. C-24, No. 4 Apr. 1975. pp. 340-347.
Ruppert, "Character Rec. Using Density Sums," *IBM Tech. Disclosure Bulletin*, vol. 18, No. 7, Dec. 1975. pp. 2190-2191.

*Primary Examiner*—Leo H. Boudreau
*Attorney, Agent, or Firm*—Fidelman, Wolffe & Waldron

[57] ABSTRACT

A process and apparatus for identifying and separating discount coupons having particular zones of color depths, shades, tonalities or the like in which both sides of the coupons are read by scanning and zones of like tones are summed to mathematically form an algorithmic "word" for comparison with a "sample word" for the identification of valid coupons.

11 Claims, 3 Drawing Figures

PROCESS AND APPARATUS FOR AUTOMATICALLY IDENTIFYING DISCOUNT COUPONS AND THE LIKE BY MEANS OF ELECTRONIC COMPARISON

This application is a continuation-in-part of Ser. No. 780,162, filed Mar. 22, 1977, now abandoned.

BACKGROUND OF THE INVENTION

At present, "discount coupons" are identified during manual redemption. Discount coupons are low-value coupons such as those printed in newspapers or magazines for sales campaigns, which are to be cut out or removed for redemption at the time of purchase.

A number of research workers attempted to automate such an identification by using the signals provided by the difference in colors on the faces of the coupons, but all these systems necessitate the previous orientation of the coupons.

These systems have several disadvantages: firstly, the time employed by a person in suitably orienting the coupons is relevant with respect to the value of the discount coupons, that is, the cost involved in evaluating the discount coupons with the known machines is too high with respect to their real value; and secondly, substantial mistakes are brought about by tedious procedures such as the orientation of the coupons.

It is the object of the present invention to avoid such sources of mistakes, and to insure a positive control of discount coupons, playing cards, and the like.

The process according to the present invention comprises the steps of sequentially scan reading individual zones making up the surface of a discount coupon or the like; converting the signals corresponding to the various color depths to an algorithmic function or "word"; and comparing such a word with a "sample word" corresponding to a "sample coupon" previously introduced into a comparing memory.

An apparatus for carrying such a process into effect is also within the field of the present invention, and comprises a "dictionary" memory including sample words corresponding to a plurality of sample coupons; means for inserting a preselected sample word into a comparing memory; means for reading the surfaces of a coupon under test according to zones making up its surfaces; and processing means for converting signals of the surfaces that are read into a single significant word and supplying it to the comparing memory for comparison with the sample word previously inserted therein.

Further features and advantages of the invention will become more apparent from the following description, when considered with the accompanying drawings, as given by mere way of unrestrictive example, and in which:

FIG. 1 is a block diagram for carrying into effect the process according to an embodiment of the present invention, wherein a sample coupon has been shown on enlarged scale; and FIG. 2 is a general schematic view showing an apparatus for carrying out the process according to the present invention; and FIG. 3 discloses face A and face B of an exemplary coupon, showing various shadings or tonalities for identification of the coupon.

In the figures of the accompanying drawings, the same reference numerals have been used to denote corresponding parts.

DETAILED DESCRIPTION OF THE INVENTION

Figure 1:
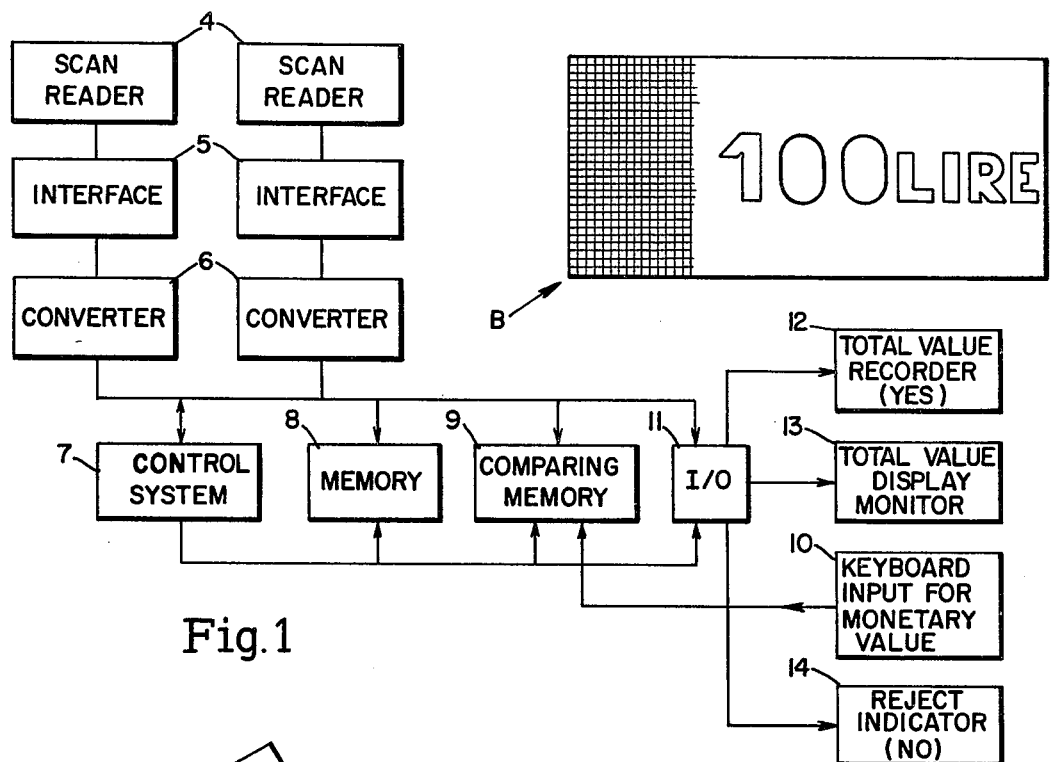
Figure 2:
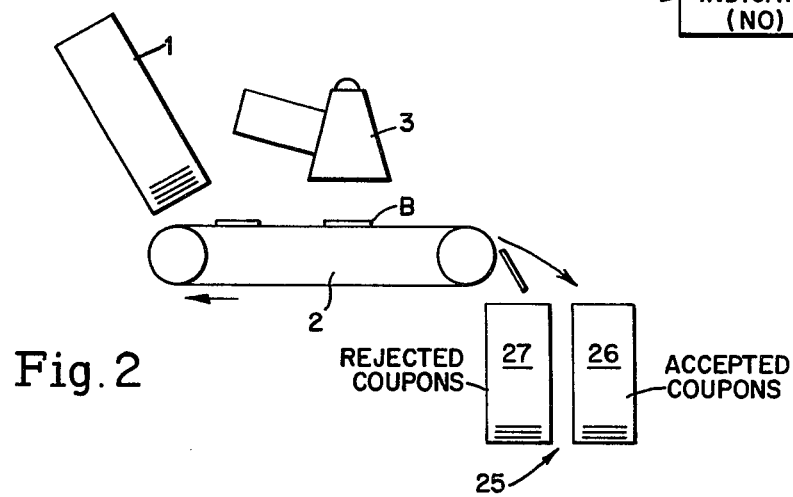

The apparatus as shown in FIG. 2 comprises a mechanism 1 for holding and feeding stacked coupons B and cooperating with conveyor belt 2, whereby coupons B are presented to the inlet of electronic device 3 shown in the block diagram of FIG. 1. This device comprises a reading system 4 (FIG. 1) by which both coupon surfaces, which are divided into a plurality of zones or sectors, are sequentially scanned.

Figure 3:
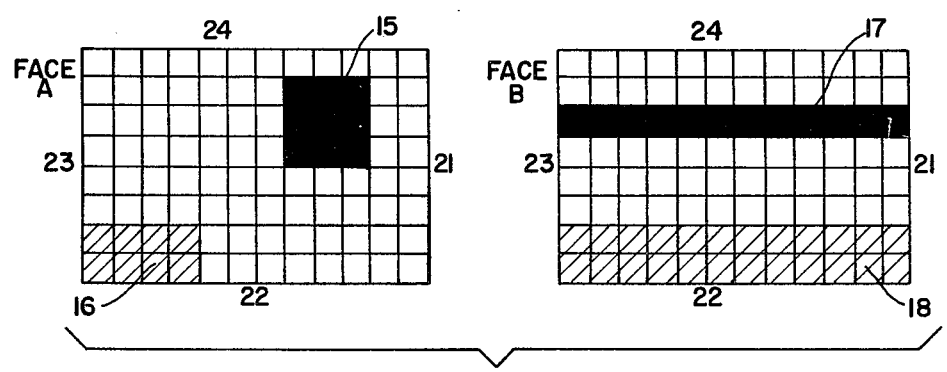

FIG. 3 discloses two faces of a typical coupon, which for the sake of simplicity, has only three tonalities: white, grey, and black. Face A has black portions 15 and grey portions 16 on a white background, while face B has black portions 17 and grey portions 18 on a white background. The coupon may be presented to the electronic device 3 with either face A or face B arranged upward and with any of the sides 21, 22, 23, or 24 arranged forwardly. That is, the coupon can be presented to the electronic device 3 in eight different ways. In any of these eight different ways, recognition will still occur. To accomplish this, it will suffice to read the coupon on both faces and add or compact the received information: the total sum of the blacks, greys and whites will be identical, no matter which presentation mode for the coupon is made. How the scan reading is carried out is unimportant, provided that it is effected on both faces. The way in which the addition or compaction of the tonalities or shades is performed is also unimportant, provided that it is accomplished. The preselected number of luminance or tonal values may range, for example, from one to two hundred and fifty. For simplicity, three different tonal values are used in this example, in which it is important that the number of equal luminance zones are summed. For example, face A has eight grey zones at 16, nine black zones at 15 and seventy-nine white zones; face B has twelve black zones at 17, twenty-four grey zones at 18 and sixty white zones. When like luminance or tonal levels are added, in this example, twenty-one black zones, thirty-two grey zones, and one hundred-thirty nine white zones result which is the coupon "word".

In FIG. 1, there are provided two readers 4, one for each face or side of the coupon. The signal supplied by each individual scanned location or zone is translated into an interface member 5 and is converted to numerical information by converter 6, e.g., an A/D converter. For example, this numerical information may be a range of value scale, the threshold of which varies from one for white to two hundred and fifty for black. A control system 7, common to the two readers 4 and associated interfaces 5 and converters 6, is so programmed that the supplied data are converted to an algorithmic function or "word" within which all the values relating to the coupon to be identified are added or compacted. These values, translated into a "sample word", are stored in a system of fixed memories 8. The sequence of these memories 8 will make up the apparatus "dictionary", thereon depending the capability of identifying all of the coupons similar to those registered for the operation. The selection of the sample word is automatic and effected in a comparing memory 9, while a keyboard 10 inserts monetary values relating to the actual value of the coupon. When readers 4 sequentially scan the surfaces of a coupon under test, the related signals of these surfaces are converted to a "word" and supplied to comparing memory 9 comparing this word with the prearranged "sample word". Should the comparison give a positive result (an acceptance signal), an electronic input/output device 11 would supply a gating signal to a magnetic cassette recorder 12 or to a display system 13. Should the comparison give a negative result (a rejection signal), device 11 would provide a rejection indication at 14. Upon identification, a pneumatic or mechanical system 25 will separate the coupons into the identified ones at 26 and those that are spoiled or unidentifiable at 27, while the sum of accepted coupons is retained in said recorder 12 or display system 13.

Summarizing, it is apparent that the novelty of the system consists of: operating on a coupon surface divided into a frame of zones or sectors of luminance or tonal values; scan reading and translating the signals of the surfaces that are read into data having mathematical values; adding these mathematical values of both surfaces of each coupon scanned so that, in whatever direction a coupon is read, it will provide like data; handling this data by means of a suitable program, so as to compact or add the same and obtain a single significant "word" relatable to the subject coupon; storing this data, so that data supplied from subsequent coupons can be compared in an electronic system with those arranged in the memory. A further development of the system will cause (for those coupons identified as equal or like coupons) the supply of a signal indicating the identification occurence, which signal can be used for later management.

It should be noted that the data supplied by the memories can be either displayed on a monitor or registered along with further management data on a magnetic tape for required handling.

Of course, the principal invention being unaltered, the details of construction and the embodiments can be widely changed over the matter described and shown, without departing from the scope of the present invention.

I claim:

1. A process for automatically identifying coupons having zones of different color tones comprising the steps of:
   (a) introducing a sample word into a comparing memory;
   (b) scan reading all zones of both surfaces of said coupons;
   (c) converting and adding signals relating to said zones of different color tones to form a word identifying each of said coupons;
   (d) comparing said word with said sample word; and
   (e) obtaining and separating acceptance signals and rejection signals relating to respective accepted and rejected coupons.

2. A process according to claim 1, including simultaneously performing said scan reading of both surfaces of said coupons.

3. A process according to claim 2, including separating said respective accepted and rejected coupons.

4. A process according to claim 2, including summing said acceptance signals.

5. A process according to claim 4, including recording said acceptance signals.

6. A process according to claim 4, including displaying said acceptance signals.

7. A process according to claim 1, including forming said sample word by scan reading all zones of both surfaces of a first coupon of said coupons and converting and adding signals relating to zones of different color tones of said first coupon.

8. An apparatus for automatically identifying coupons having zones of different color tones comprising a dictionary memory including sample words, means for introducing one of said sample words into a comparing memory, means for scan reading said zones of each of said coupons and obtaining signals corresponding to said different color tones, means for converting said signals to numerical data, control system means for converting and adding said numerical data to form a word and supplying said word to said comparing memory for comparison with said sample word whereby an acceptance or rejection signal is developed for each of said coupons, and means for separating said coupons according to said acceptance or rejection signal.

9. An apparatus according to claim 8, wherein said means for scan reading comprises separate means for scan reading each side of said coupons and said means for converting said signals corresponding to said different color tones comprises separate means for converting said signals corresponding respectively to said separate means for scan reading, whereby said separate means for converting said signals feed the converted signals to said microprocesser.

10. An apparatus according to claim 1, further comprising a keyboard for introducing monetary values corresponding to the monetary values of said coupons into said comparing memory.

11. An apparatus according to claim 1, further comprising means for feeding said coupons to and from said means for scan reading and to said means for separating said coupons.

* * * * *